United States Patent [19]
Edwards et al.

[11] Patent Number: 5,878,992
[45] Date of Patent: Mar. 9, 1999

[54] TWO STAGE VARIABLE FLOW VALVE ASSEMBLY

[75] Inventors: Nicholas P. Edwards, Shelton; Paul Summers, Cheshire; Donald Lafayette, Litchfield, all of Conn.

[73] Assignee: Mott's Inc., Stamford, Conn.

[21] Appl. No.: 852,628

[22] Filed: May 7, 1997

[51] Int. Cl.⁶ .......................... F16K 47/08; F16K 31/122
[52] U.S. Cl. .......................................... 251/122; 251/63.5
[58] Field of Search ........................ 251/62, 63, 63.5, 251/120, 121, 122

[56] References Cited

U.S. PATENT DOCUMENTS

| | | | |
|---|---|---|---|
| 629,249 | 7/1899 | Hardin | 137/390 |
| 774,985 | 11/1904 | Jones | 251/273 |
| 1,454,658 | 5/1923 | Spahr | 431/279 |
| 1,630,947 | 5/1927 | Jenks | 137/636 |
| 1,720,389 | 7/1929 | Binks | 251/122 |
| 1,911,561 | 5/1933 | Fitts | 251/122 |
| 2,035,202 | 3/1936 | Smith | 255/5 |
| 2,236,620 | 4/1941 | Cornelius | 251/132 |
| 2,509,880 | 5/1950 | Pelton | 251/63 |
| 2,532,578 | 12/1950 | Spencer | 251/63.5 |
| 2,575,775 | 11/1951 | Teeters | 251/31 |
| 2,610,063 | 9/1952 | Faucheux | 277/42 |
| 2,652,857 | 9/1953 | Engstrum | 137/701 |
| 3,243,157 | 3/1966 | Beck | 251/122 |
| 3,476,147 | 11/1969 | Hitt et al. | 251/122 |
| 3,512,550 | 5/1970 | Ammann | 251/122 |
| 3,636,978 | 1/1972 | Byers | 251/122 |
| 4,009,861 | 3/1977 | Hirst | 251/61.1 |
| 4,155,535 | 5/1979 | Seamone | 251/282 |
| 4,302,178 | 11/1981 | Belknap et al. | 251/122 |
| 4,345,736 | 8/1982 | Zeuner et al. | 251/30 |
| 4,522,222 | 6/1985 | Carey, Jr. | 251/122 |
| 4,545,409 | 10/1985 | Luhmer | 137/625.64 |
| 4,672,203 | 6/1987 | Holkeboer | 250/289 |
| 4,856,757 | 8/1989 | Dall'Aglio | 251/335.2 |
| 4,872,638 | 10/1989 | Thompson et al. | 251/54 |
| 4,874,014 | 10/1989 | Grant et al. | 251/63.5 |
| 4,921,214 | 5/1990 | Jernberg | 251/335.2 |
| 5,065,789 | 11/1991 | Eslinger | 251/122 |
| 5,123,450 | 6/1992 | Wood et al. | 137/625.69 |
| 5,186,208 | 2/1993 | Hansen | 137/505.6 |
| 5,251,730 | 10/1993 | Ackermann et al. | 188/299 |
| 5,503,363 | 4/1996 | Wallace | 251/63 |

*Primary Examiner*—George L. Walton
*Attorney, Agent, or Firm*—Pennie & Edmonds LLP

[57] ABSTRACT

The present invention relates to a two stage variable flow valve assembly for use in fluid handling. The valve assembly includes a body with a flow restrictor disposed therein to define two internal chambers which are closed at one end by a wall and open at the opposite end by a discharge opening. A valve having a bulb and a profiled valve stem extends axially through and is movable within the internal chambers to open and close the valve assembly for flow therethrough. Flow is halted through the valve assembly when a portion of the profiled valve stem enters the flow restrictor, prior to the bulb's closing of the discharge opening.

20 Claims, 7 Drawing Sheets

TWO STAGE VARIABLE FLOW VALVE ASSEMBLY

FIELD OF THE INVENTION

The present invention relates to fluid handling components and, more particularly, to a two stage variable flow valve assembly for use in fluid handling.

BACKGROUND OF THE INVENTION

In the field of fluid handling, valves are often used for the purpose of filling containers, such as bottles, on a manufacturing line. Containers on an assembly line are moved into position below valve assemblies and liquid flows through the valve assemblies and is dispensed into the containers. The valve assemblies are opened to allow liquid to enter the containers and then closed after the containers are appropriately filled. This fluid entering the valve assemblies is often under pressure. When a valve assembly is opened and closed under unrestrained flow conditions, the fluid exiting through the valve assembly has a tendency to splatter.

The problem of splattering is more likely when an aseptic type of valve assembly is used because aseptic valves typically include a diaphragm to seal the product/actuator stem interface. An aseptic valve assembly is typically used where sterile conditions are required, such as, inter alia, when food is being handled. For instance, when juice is being bottled, the juice is first heated and then cooled to insure that the juice is sterile. In addition, the bottle is sterilized prior to being filled. The juice travels through the valve assembly and is dispensed into the sterilized bottle. Aseptic valves, utilized for this purpose, typically include a diaphragm to seal the product/actuator stem interface in order to prevent the juice from exiting the valve at an undesirable location and to prevent contaminants from entering the juice through the valve assembly.

The use of a diaphragm in aseptic valves tends to result in a greater likelihood and occurrence of splattering. As the aseptic valve is opened or closed under unrestrained flow conditions, the diaphragm inside of the valve assembly has a tendency to flex, which exerts a pressure wave on the tip of the valve near the exit point of the valve assembly. The pressure wave typically occurs just as the tip of the valve approaches its seat, or point of closure, which causes a rapid acceleration of the liquid stream. Rapid acceleration can cause a disruption in the column of liquid exiting the valve assembly, such as a jetting effect, which causes the product to splash out of the container. This is an undesirable characteristic in that it results in a waste of the product as well as contamination or soiling of the production line. Thus, it is desirable to reduce the likelihood of splatter.

It is also desirable to provide a valve assembly which is useful with different types of products, including those having a tendency to foam. Foaming may be reduced by reducing or restricting the liquid filling velocity of the valve assembly. Thus, it is desirable to provide a valve assembly which is adjustable to provide varying rates of flow of the product through the valve assembly.

SUMMARY OF THE INVENTION

The present invention meets these and other objectives by providing a valve assembly including a body, a valve, and a means for actuating the valve. The body defines an internal chamber having a wall at a first end and a discharge opening at a second end. The internal chamber is divided into a first chamber and a second chamber by an inwardly extending flow restrictor portion. The first chamber is located adjacent the wall and has an inlet for receiving a fluid. The second chamber is located adjacent the discharge opening.

The valve extends axially through and is movable within the internal chamber and has a shaft of varying diameter operatively associated with the flow restrictor portion. One end of the shaft is connected to a bulb. The bulb is positioned in the second chamber. The shaft extends from the bulb and second chamber through the first chamber and through the wall. The bulb is engagable with the discharge opening to seal the discharge opening when the shaft is in association with the flow restrictor portion.

The means for actuating the valve is for actuating between a first position, wherein fluid does not flow through the body and a second position wherein the flow of fluid through the flow restrictor portion and discharge opening is permitted.

The actuating means may also be actuatable to a third position, wherein fluid does not flow through the flow restrictor portion while flow through the discharge opening is permitted. A fourth position is also provided wherein fluid flows through the flow restrictor portion and the discharge opening at a reduced rate.

The valve assembly may also include a flexible seal providing a leak-proof barrier between the first chamber and the wall. The shaft extends through the seal. The flexible seal may be a diaphragm positioned between the body and the wall at the first end of the body and a ring is coupled to an exterior of the wall and the body to hold the wall, diaphragm and body together.

The body of the valve assembly includes a valve seat positioned in the discharge opening and the bulb is engagable with the valve seat to seal the discharge opening. The bulb may be tapered at the end adjacent the discharge opening. The valve seat is annular for sealingly engaging said bulb when the actuating means is in the first position. The tapered end of the bulb extends through the discharge opening when in the first position to engage the valve seat.

The first and second chambers of the body may be cylindrical and the first chamber has an internal diameter substantially equal to an internal diameter of the second chamber. Alternatively, the first chamber has an internal diameter greater than an internal diameter of the second chamber.

The flow restrictor portion has an internal diameter which is smaller than the internal diameters of the first and second chambers and includes a first and a second slanted wall. The first slanted wall is adjacent the first chamber and the second slanted wall is adjacent the second chamber. The slanted walls are inwardly slanting toward each other and define an opening at a narrowest point of the flow restrictor portion.

The shaft extends through the opening in the flow restrictor portion and is cylindrical. The shaft includes a first and second portion, with the first portion having a diameter greater than the second portion. The second portion is connected to the bulb. A tapered portion of the shaft is positioned between the first portion and the second portion.

The first portion of the shaft may be substantially the same diameter as the opening in the flow restrictor portion so that when the first portion enters the opening, fluid does not flow through the opening. When the tapered portion of the shaft enters the opening in the flow restrictor portion, flow is reduced.

The means for actuating the valve may be an air cylinder which defines an internal air chamber having a first and a second end. The air cylinder is connected at the second end to the wall at the first end of the body. The air cylinder defines a second wall at the first end thereof. The shaft extends from the first chamber into the internal air chamber and through the second wall. The shaft is actuated by air pressure which enters and exits the air chamber.

The shaft also includes a piston portion positioned within the internal air chamber. The piston portion has a diameter which is substantially the same size as the internal diameter of the internal air chamber so as to provide a seal between a first portion and a second portion of the internal chamber. The piston is axially movable within the internal air cylinder.

The air cylinder includes a first opening and a second opening. Each opening is for allowing the inlet and outlet of air. The first opening leads to the first portion of the internal air chamber and the second opening leads to the second portion of the internal air chamber. Air entering through the first opening creates pressure on the piston to move the shaft toward the first position and air entering through the second opening creates pressure on the piston to move the shaft toward the second position.

An adjusting stud may be associated with the first end of the air cylinder and positioned in axial alignment with the shaft. The stud is for contact with an end of the shaft to define the range of movement of the shaft and, thereby, the rate of fluid flow through the discharge opening.

BRIEF DESCRIPTION OF THE DRAWINGS

Preferred features of the present invention are disclosed in the accompanying drawings, wherein similar reference characters denote similar elements throughout the several views, and wherein.

DETAILED DESCRIPTION OF THE INVENTION

Figure 1:
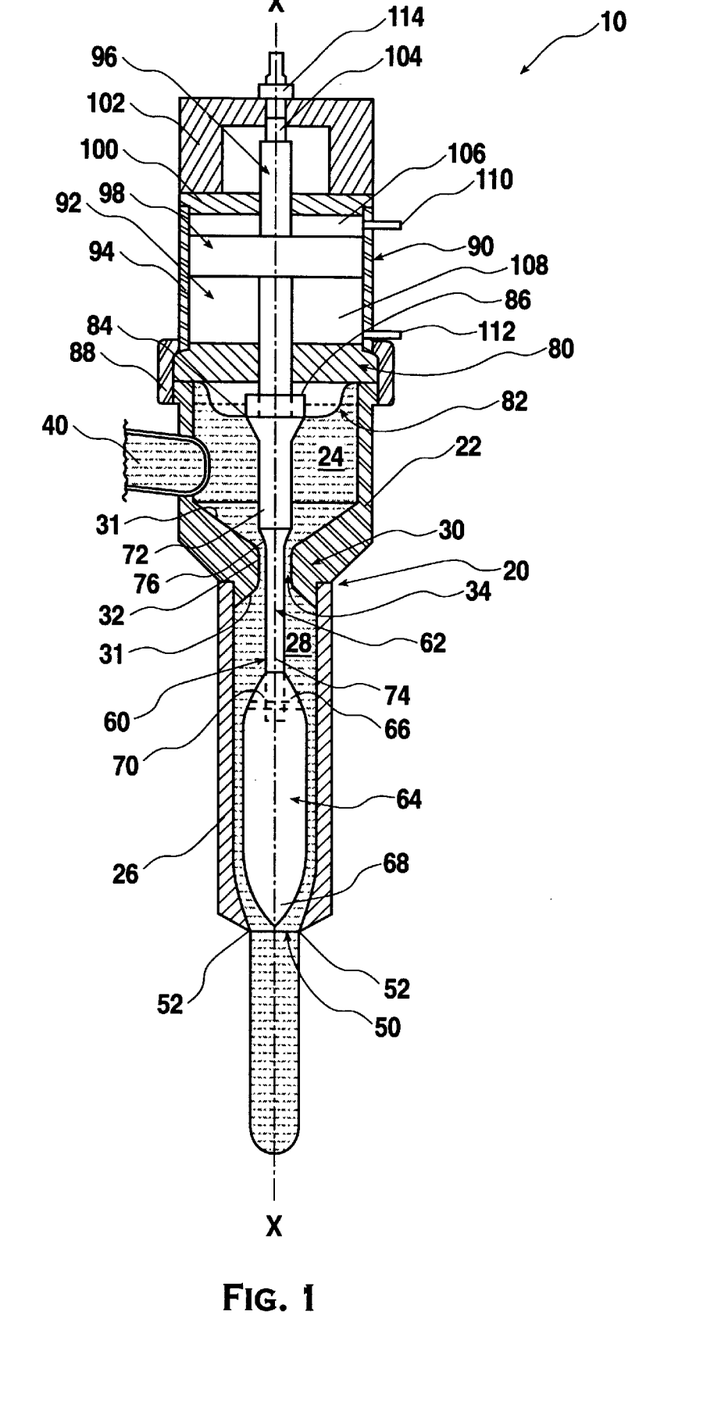
FIG. 1 is a partial cross-sectional view of an aseptic valve assembly of the present invention showing the valve assembly at full delivery.
Figure 2:
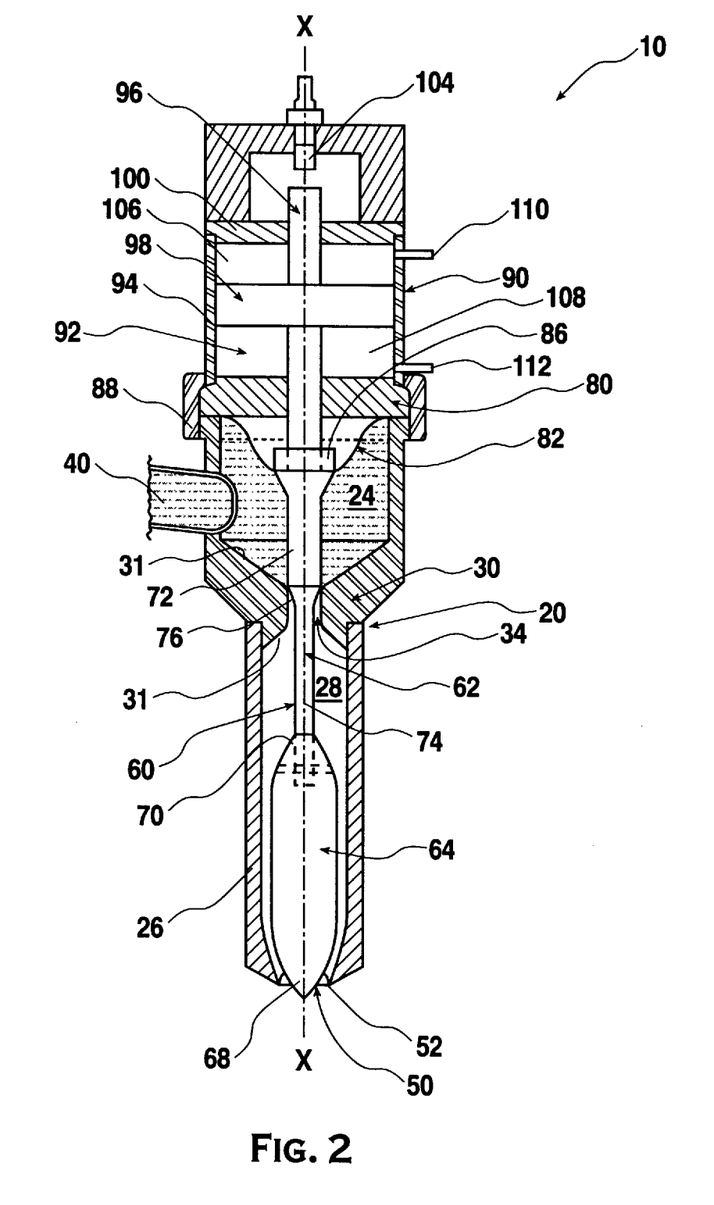
FIG. 2 is a partial cross-sectional view of the aseptic valve assembly depicted in FIG. 1 with the valve positioned to terminate (or initiate) flow.
Figure 3:
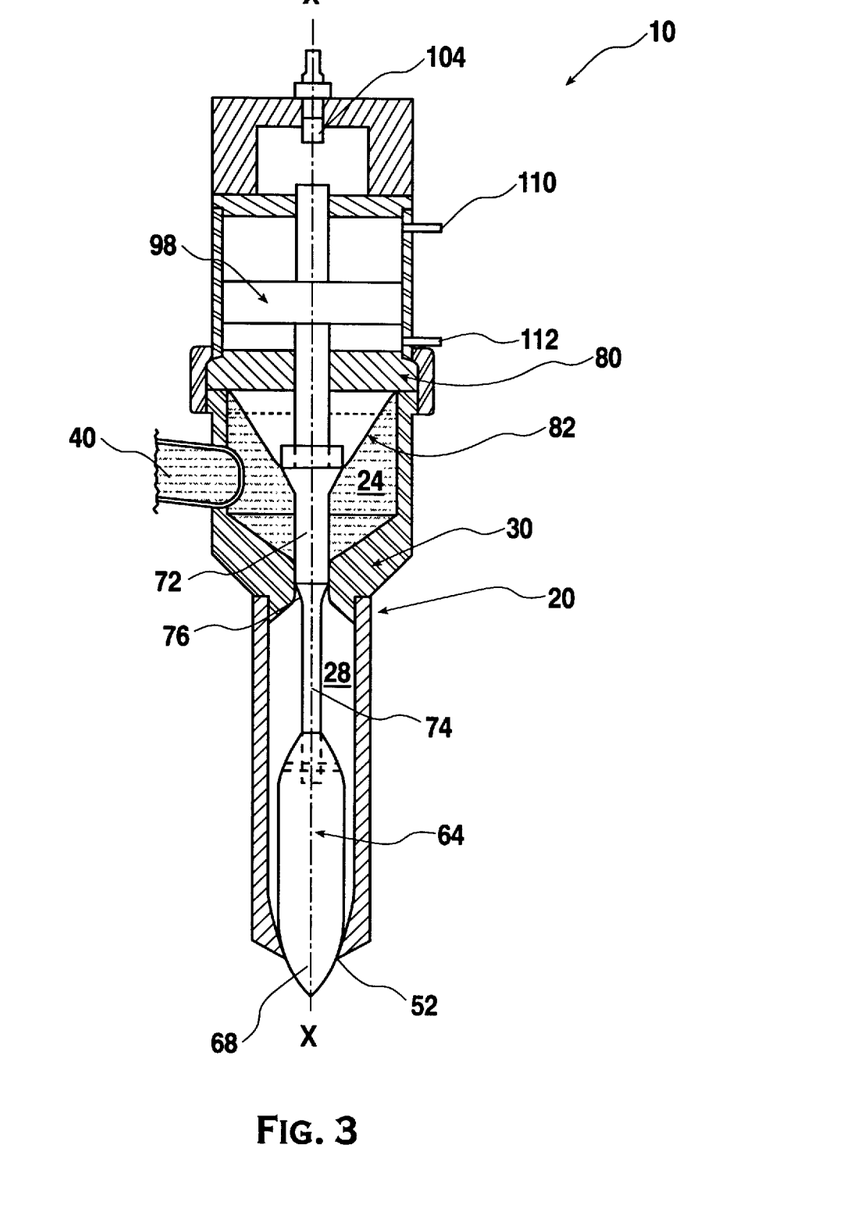
FIG. 3 is a partial cross-sectional view of the aseptic valve assembly depicted in FIG. 1 with the valve in a fully closed position.

Referring to FIGS. 1–3, the valve assembly 10 includes an outer casing or body 20 which has an upper casing 22 defining a first internal chamber 24 and a lower casing 26 defining a second internal chamber 28. A flow restrictor portion 30 is positioned between the first 24 and second 28 chambers.

Figure 5:
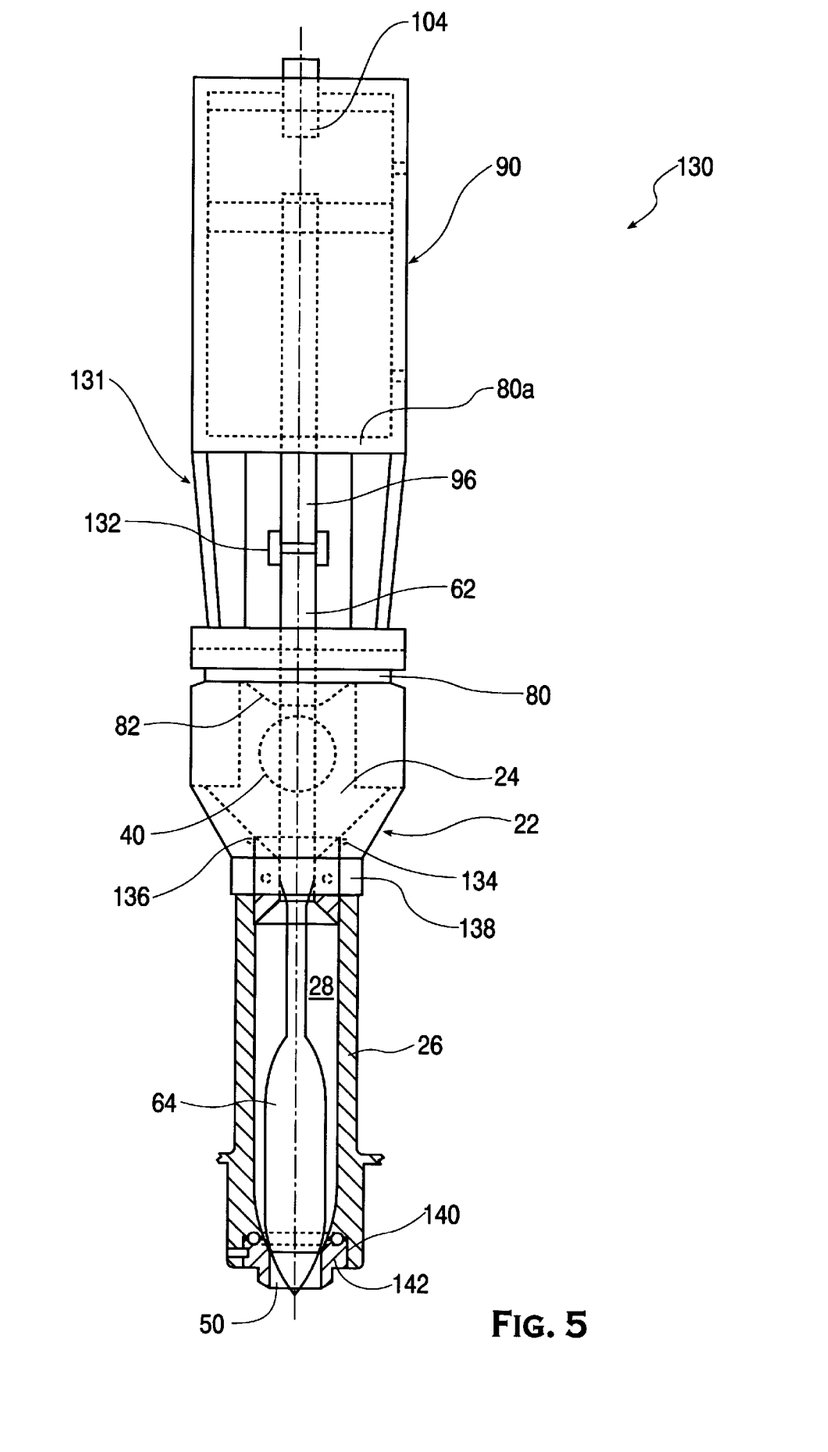
FIG. 5 is a partial cross-sectional view of an alternative embodiment of the valve assembly of the present invention depicting an aseptic valve assembly.

The flow restrictor portion 30 is preferably formed independently of the upper 22 and lower 26 casings. When the flow restrictor portion 30 is independent of the upper 22 and lower 26 casings, it may be formed as an intermediate portion (as shown in FIG. 5) disposed between the upper 22 and lower 26 casings. Alternatively, as shown in FIGS. 1–3 the flow restrictor portion 30 may be integrally formed as part of the upper casing 22 of body 20 or may be integrally formed with the lower casing 26.

The flow restrictor portion 30 preferably extends inwardly from the outer wall of the body 20. The flow restrictor 30 forms a wall 31 at an end of the first chamber 24 and second chamber 28. The flow restrictor walls 31 preferably slope at an angle inwardly toward the adjacent chamber to define an inner portion 32 which is narrower than an outer portion. This slope may be at any angle below about 90°. Thus, it is not required of the invention that the flow restrictor 30 actually have slanting walls, although slanting walls are desirable to provide aerodynamic flow patterns through the first and second chambers (24, 28). A substantially cylindrical channel or aperture 34 is provided in the flow restrictor 30 adjacent the inner portion 32. The aperture 34 is preferably defined at the center of the flow restrictor 30 along longitudinal axis X—X.

As will be discussed in greater detail below, the flow restrictor 30 works in conjunction with a profiled valve stem to halt the flow of a product from the first chamber 24 into the second chamber 28 after the profiled valve stem has traveled a short distance. This allows the tip of the valve stem to be closed under very low flow conditions, thereby preventing or significantly reducing the likelihood of splatter.

The upper casing 22 and lower casing 26 are preferably made of plastic or metal, or any other conventionally known material. Most preferably, the casings 22, 26 are made of 304 or 316 stainless steel. The upper and lower casings may be connected to each other in any conventionally known manner, such as by welding, adhesive, or the like. Most preferably, the upper and lower casings 22, 26 are clamped together.

An inlet conduit 40 is associated with the upper casing 22 for delivering a product flow to the first chamber 24. The inlet conduit 40 may be a pipe or tube, or any other type of conduit useful in delivering a product to a chamber. The inlet conduit 40 enters the first chamber 24 upstream of the flow restrictor portion 30. Flow entering the valve assembly 10 through inlet conduit 40 will generally be under pressure.

The term "upstream" is used herein to define the location of flow prior to the part being identified. The term "downstream" is used herein to define the location after the flow has passed by the part being identified. Thus, for example, for flow entering through the first chamber 24 and exiting from the second chamber 28, the first chamber 24 is defined as "upstream" of the second chamber 28 while the second chamber 28 is defined as "downstream" of the first chamber 24.

As is shown in FIG. 1, the upper and lower casings (22, 26) of the valve assembly 10 are preferably cylindrical and aligned on a common centrally defined longitudinal axis X—X to define generally cylindrical internal chambers. Each internal chamber has an internal diameter. For the embodiment shown in FIGS. 1–3, the first chamber 24 preferably has an internal diameter which is greater than the internal diameter of the second chamber 28, although this is not critical to the invention.

The lower casing 26, defining the second chamber 28, includes a discharge opening 50 having a valve seat 52. The discharge opening 50 is preferably substantially annular. The lower casing 26 preferably tapers inwardly from a maximum diameter to the discharge opening 50 to define a radiused opening having a diameter smaller than the maximum internal diameter of the second chamber 28. The valve seat 52 is preferably independent from lower casing 26 and removable to allow for different sized outlets or openings 50.

A valve 60, including a shaft or stem 62 and a closing plug or bulb 64, is positioned within and extends longitudinally through the first 24 and second 28 chambers. The shaft 62 and bulb 64 are preferably generally cylindrical in shape and have a varying, profiled cross-section. The closing bulb 64 is preferably connected to the shaft 62 by a pin 66, although this is not critical to the invention and the bulb 64 may be connected to the shaft in any conventional manner, such as by screw threads. The bulb 64 is preferably tapered at the tip 68 of the valve 60 and configured and dimensioned to seat within the valve seat 52 of the discharge opening 50 to seal the opening 50 shut, thereby preventing any fluid from passing through the discharge opening 50. The bulb 64 may, alternatively, be conical, rounded, or any other conventionally known shape. The upper end 70 of the bulb 64 may also be tapered to provide a more aerodynamic flow path around the bulb 64 and through the second chamber 28 in the lower casing 26. Further, the bulb 64 preferably includes vertical fins which are utilized to create laminar flow through the valve 60.

The valve stem or shaft 62 is preferably profiled to define a varied cross-section. The shaft 62 includes a first portion 72 and a second portion 74. The first portion 72 preferably has a diameter which is larger than the diameter of the second portion 74. The second portion 74 tapers outwardly to define a tapered intermediate portion 76 which joins with the first portion 72. This tapered intermediate portion 76 defines the connection between the first 72 and second 74 portion of the valve stem 62.

The first portion 72 of the valve stem 62 preferably has a diameter which is substantially about the same size as the diameter of the channel 34, provided in the flow restrictor portion 30. The first portion 72 is preferably sized to allow the first portion 72 to enter and move axially within channel 34, while, at the same time, stopping flow between the first chamber 24 and the second chamber 28. Thus, when first portion 76 is positioned in channel 34, flow through channel 34, and hence out of discharge opening 50, is halted.

Prior to entry of first portion 72 into channel 34, when part of tapered portion 76 is positioned in channel 34, flow is limited relative to a fully open flow condition. FIG. 1 shows the fully open flow condition. As is shown in FIG. 1, intermediate tapered portion 76 in not positioned within channel 34. Thus, flow around second portion 74 is only limited in the fully open flow condition by the size of the channel 34 and the size of the second portion 74.

FIG. 2 shows an intermediate flow condition. As shown in FIG. 2, as valve 60 is moved toward the closed position, first portion 72 enters channel 34 to stop flow. FIG. 2 alternatively shows, as valve 60 is moved toward the fully open position, first portion 72 at the point where it exits channel 34 to initiate flow.

FIG. 3 shows the valve in the fully closed position with the bulb 64 positioned on the valve seat 52. As shown in FIG. 3, first portion 72 of valve stem 62 is extended into channel 34 and bulb 64 has fully closed discharge opening 50.

As is clearly evident, the amount of maximum allowable flow through channel 34 is determined by both the size of channel 34 and by the diameter of the second portion 74 of the shaft 62. The larger the second portion 74 for a given sized channel 34, the less flow is permitted.

Referring again to FIGS. 1–3, the first chamber is preferably terminated by plate or wall 80. In the aseptic valve assembly 10 shown, a seal or diaphragm 82 is positioned between the first chamber 24 and the plate 80. As is shown, shaft 62 extends through an opening 84 in diaphragm 82 and wall 80.

The diaphragm 82 is preferably flexible and provides a seal between the first chamber 24 and the actuating mechanism of the valve, which will be discussed in greater detail below. The diaphragm 82 positively prevents the liquid entering the first chamber 24 from leaking from the first chamber 24 into the actuating mechanism of the valve structure. The diaphragm 82 also prevents leakage of contaminants into the first chamber 24.

Diaphragm 82 is preferably substantially circular and is preferably constructed of any durable, resilient elastomeric material. The preferable material depends upon the end use of the valve assembly 10. Diaphragm 82 can be constructed of urethanes, silicones, or rubber materials such as neoprenes, natural rubber, nitrile rubber, EPR, EPDM or the like. More preferably, diaphragm 82 is constructed of a reinforced EPDM. The selected material is preferably impervious to liquid penetration and able to withstand high temperatures for sterilization.

At its outer periphery, the diaphragm 82 is preferably clamped between the upper casing 22 and plate 80. At the point where the shaft 62 of valve 60 passes through diaphragm 82, nut 86 retains diaphragm 82 against shaft 64 to form a hermetical joint. Threaded ring 88 is preferably positioned around the exterior of the valve assembly 10 to hold the upper casing 22 and plate 80 together, with the diaphragm 82 clamped between upper casing 22 and plate 80 to form a second hermetical joint at the periphery of diaphragm 82. Threaded ring 88 may, alternatively, be any type of known means for joining together several parts in a tight association.

Plate 80 may form the head end of valve actuating member 90. In a more preferred alternative embodiment, shown in FIG. 5 and discussed in greater detail below, wall 80A forms the head end of the end wall. The embodiment of the valve actuating member shown in FIGS. 1–4 is an air cylinder 92 which includes a preferably cylindrical tube 94, a shaft extension 96, a piston 98, and a rear head 100. The tube 94 is positioned at one end adjacent plate 80 and is preferably joined to plate 80. As shown in FIGS. 1–3, tube 94 may be joined to the body 20 by threaded ring or clamp 88. Thus, in this embodiment, threaded ring serves to hold together tube 94, plate 80, upper casing 22, and diaphragm 82. Plate 80 closes the upstream end of air cylinder 92 and rear head 100 serves to close the downstream end.

Shaft extension 96 is preferably connected to shaft 62, by locking nut 86 and extends longitudinally through plate 80, air cylinder 92, and rear head 100. Piston 98 is preferably positioned inside of cylinder 92 and is connected to shaft extension 96. Shaft extension 96 and piston 98 are axially movable within air cylinder 92. Further, since shaft extension 96 is connected to shaft 62, shaft extension 96 moves with the movement of shaft 62.

Air cylinder 92 preferably has a constant-sized internal diameter along its axial length. Piston 98 is preferably disc-shaped and has an outer diameter which is substantially about the same size as the internal diameter of the air cylinder 92 such that the piston 98 is axially movable within the air cylinder 92. Piston 98 also preferably maintains a tight seal with the internal walls of the air cylinder 92 to define an independent air chamber on both the upstream and downstream side of the piston 98.

A first air chamber 106 is positioned upstream of the piston 98 and a second air chamber 108 is positioned downstream of the piston 98. Each air chamber is sealed off from the adjacent air chamber by the tight fit between piston 98 and the inner walls of the air cylinder 92. Air inlets 110, 112, are provided in the form of transversely extending tubes which extend from the exterior of the tube 94 into the first 106 and second 108 air chambers, respectively.

Valve 60 and shaft extension 96 may be moved axially by varying the air pressure within the air cylinder 92. For instance, to move valve 60 away from discharge opening 50, air pressure is increased in the second air chamber 108 by allowing air to enter through tube 112 while air is allowed to exit through tube 110. This allows piston 98, and valve 60, to move away from discharge opening 50.

To move valve 60 toward discharge opening 50, the reverse is true. Air is allowed to enter tube 110 and exit through tube 112. As air enters the first air chamber 106 through tube 110, the air exerts pressure on piston 98 to move piston 98, and valve 60, toward discharge opening 50.

The actuating member also preferably includes means for limiting the longitudinal travel distance of the valve 60. For this purpose, a retaining structure 102 is preferably connected to rear head 100 by any conventional means of attachment or may be integral with the air cylinder. Retaining structure 102 carries adjusting stud 104. Adjusting stud 104 is associated with locking nut 114, which is used to hold adjusting stud 104 in position on retaining structure 102. Adjusting stud 104 is movable axial and is contacted by shaft extension 96 to limit the axial movement of valve 60.

Adjusting stud 104 may be used to change the rate of flow through the valve assembly. By moving adjusting stud 104, the tapered portion 76 of shaft 62 may be raised or lowered to engage part of channel 34 when the valve assembly 10 is in the fully open position. When tapered portion 76 is positioned within the channel 34 of flow restrictor 30, but before first portion 72 enters channel 34, flow is limited through the valve assembly 10.

In operation, the valve assembly 10 is initially closed, as shown in FIG. 3. Partial lifting of valve shaft 62, as shown in FIG. 2, does not initiate product flow. When valve shaft 62 passes the point at which the first portion 72 of the shaft 62 exits the channel 34 of flow restrictor 30, product flow commences. Product flow reaches a maximum when valve shaft 62 is lifted so that shaft extension 96 contacts adjusting stud 104, as shown in FIG. 1.

In closing the valve assembly 10, the foregoing sequence is reversed. Flow stops when the first portion 72 of the valve shaft enters channel 34, as shown in FIG. 2. From this point on, total closure of the valve assembly 10 continues essentially without flow. Bulb 64 rests in the valve seat 52 to finish the cycle and entirely close the valve assembly 10.

The flow restrictor portion 30 in combination with the profiled valve stem 62, which stops the product flow after a very short actuator travel distance, allows the valve tip 68 to be closed under very low flow conditions. This prevents the splatter that often occurs when the valve tip 68 is opened or closed under unrestrained flow conditions.

Figure 4:
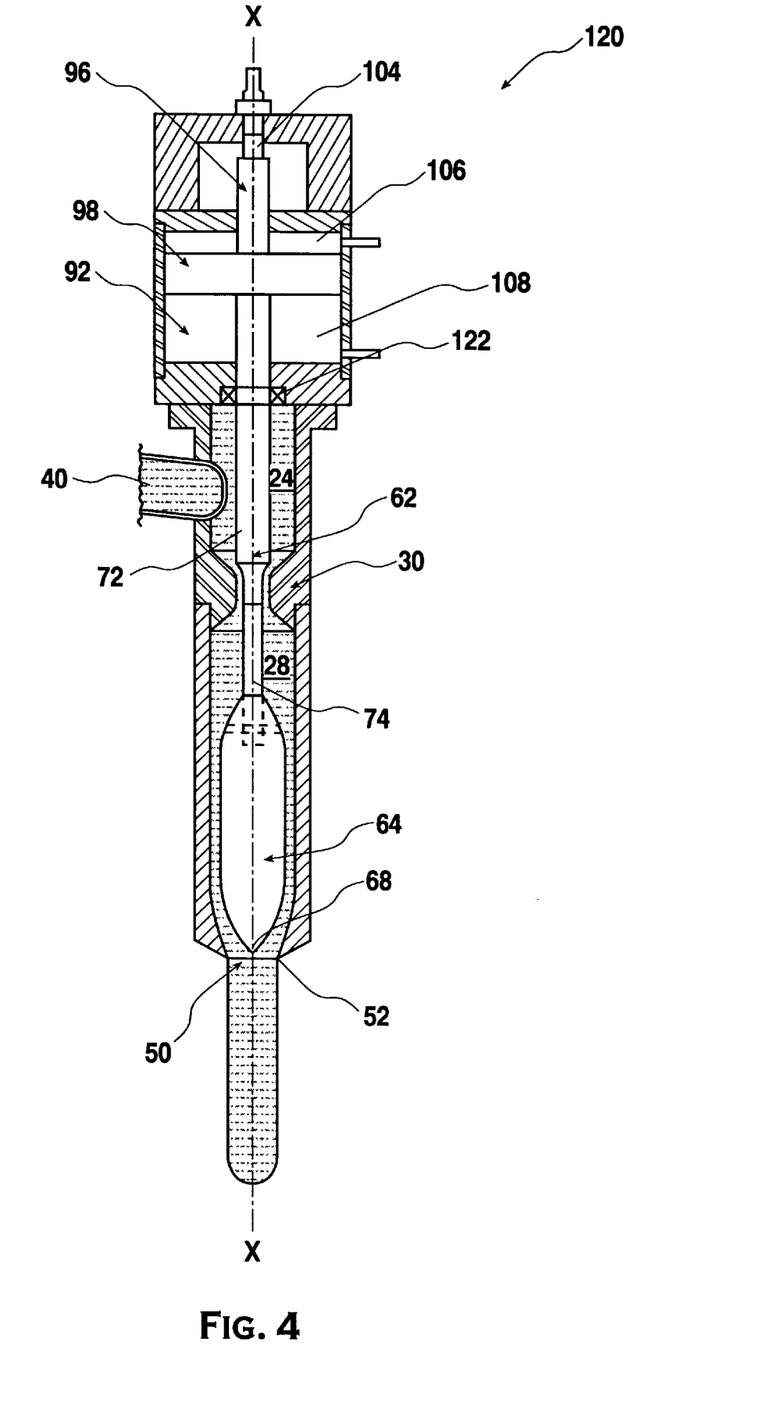
FIG. 4 is a partial cross-sectional view of an alternative embodiment of the valve assembly of the present invention depicting a non-aseptic valve at full delivery.

An alternative embodiment of the present invention is depicted at full delivery in FIG. 4 for a non-aseptic valve assembly 120 which incorporates a flow restrictor 30 and a profiled valve stem 62. The non-aseptic valve assembly 120 does not utilize a diaphragm 82. However, other than the lack of diaphragm 82, the valve assembly 120 is very similar to the valve assembly 10, shown in FIGS. 1–3.

Other differences are shown between the valve assembly 120 of FIG. 4 and that of FIGS. 1–3. For instance, the first and second chambers (24, 28) of FIG. 4 have a substantially similarly-sized internal diameter, although this is not critical to the invention or to this embodiment. Further, in this embodiment, seal 122 is utilized rather than diaphragm 82 to provide a barrier between first chamber 24 and air cylinder 92. The embodiment shown in FIG. 4 operates in the same manner as the valve assembly 10, depicted in FIGS. 1–3.

Referring to FIG. 5, a preferred alternative embodiment of the aseptic valve assembly 130 is shown. In this embodiment, a commercially available valve actuating member 90 is provided which is associated with a commercially available upper casing 22 and first internal chamber 24 having a built-in inlet conduit 40. The upper assembly 131, comprising both the valve actuating member 90 and upper casing 22, is commercially available as the ARC Aseptic Remote-Controlled Valve by G & H, an Alfa Laval company. Since the upper assembly 131 is commercially available, details of the construction are not shown. It is shown, however, that the valve actuating member of this commercially available assembly 131 follows the same basic principles described above for FIGS. 1–4.

FIG. 5 shows plate 80A forming the head end of the valve actuating member 90. Plate 80 continues to form the end of first internal chamber 24. Shaft 62 is connected to shaft extension 96 by coupling 132. Diaphragm 82 is shown positioned between plate 80 and the outer walls of upper casing 22. The flow restrictor portion 30 is positioned within a bottom portion of the interior of upper casing 22 to fit snugly therewithin. Upper casing 22 preferably has a substantially circular depression 134 for receiving appendages 136 of flow restrictor 30. Appendages 136 may, but are not required to, be uniform in shape. It is required, however, that flow restrictor portion 30 fit sufficiently tightly within the upper casing 22 to provide a substantially leak-proof joint between the first internal chamber 24 and the second internal chamber 28. Shaft 62 is profiled as shown and described in FIGS. 1–4. In operation, the valve assembly 130 operates in the same manner as valve assembly 10 and 120.

Upper casing 22 is preferably connected to lower casing 26 by clamp 138. Clamp 138 holds the upper casing 22, lower casing 26, and flow restrictor 30 in tight association.

Lower casing 26 preferably includes a recess 140 for receiving removable valve seat 142. Valve seat 142 is preferably a quick connect member which is easily attachable and detachable and which is contoured for association with bulb 64 so that when bulb 64 is lowered into valve seat 142, discharge opening 50 is sealed.

While not shown, an end cap mechanism may be associated with the lower casing 26 and may be used to clean the tip of the valve assembly and/or to close off the end of the valve assembly.

Referring to FIGS. 6–9, a preferred embodiment of bulb 64 is shown. Bulb 64 preferably includes a main body 144, a seal tip 146, and a tip pin 148. Main body 144 is shaped in essentially the same shape as bulb 64 shown in FIGS. 1–4. The bulb 64 is preferably tapered at both the tip end 68 and the tail end 150, and is configured and dimensioned to seat within the valve seat 142 of the discharge opening 50 to seal the opening 50 shut. Main body 144 has a substantially cylindrical portion which tapers into a point of connection with shaft 62 at the tail end 150. Where main body 144 meets shaft 62, main body 144 is only slightly larger in diameter than the diameter of the second portion 74 of shaft 62.

Main body 144 includes a first axial bore 152 extending inwardly from the tail end 150 into the interior of main body 144 and a second axial bore 154 extending inwardly from the tip end 68. The bores 152, 154 are substantially cylindrically shaped and preferably do not join with each other in the interior of the bulb 64.

The first axial bore 152 is for receiving the shaft 62. First axial bore 152 is preferably configured and dimensioned to received shaft 62 in snug engagement. Shaft 62 may be joined to main body 144 by pin 156, or, alternatively, may be connected by screw threads (not shown). Any other conventional means for connection is also contemplated.

Figure 6:
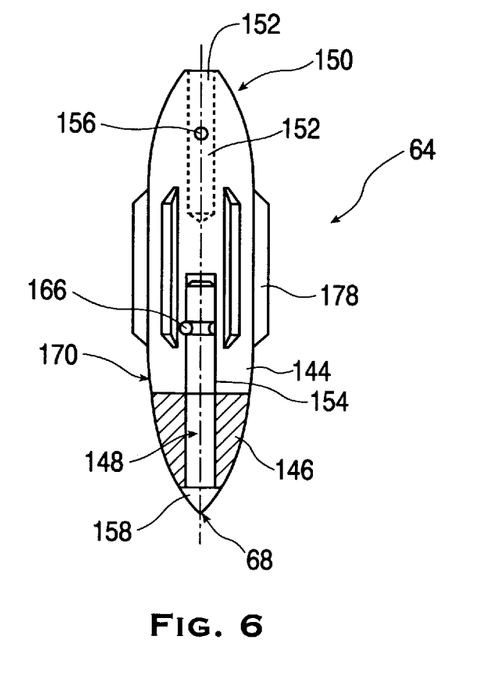
FIG. 6 is a partial cross-sectional view of the closing bulb utilized in the valve assembly of FIG. 5.
Figure 8:
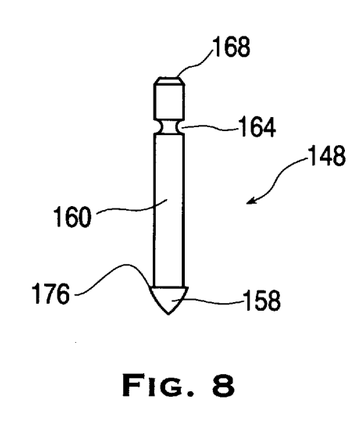
FIG. 8 is an elevated view of the tip pin utilized with the closing bulb depicted in FIG. 7.

The second axial bore 154 is for receiving tip pin 148. Tip pin 148 is shown in FIG. 8 and is a substantially cylindrical member having a cone 158 at a first end which attaches to a main cylindrical body 160. The second end of the tip pin 148 may include a chamfer 162, as shown. In addition, tip pin 148 preferably includes a recess 164 which extends circumferentially around the exterior of the main cylindrical body 160 near the second end. As shown in FIG. 6, tip pin 148 may be secured within main body 144 by pin 166, which is received in recess 164. Alternatively, tip pin 148 may be attached to main body 144 by screw threads or any other known attachment means.

Figure 9:
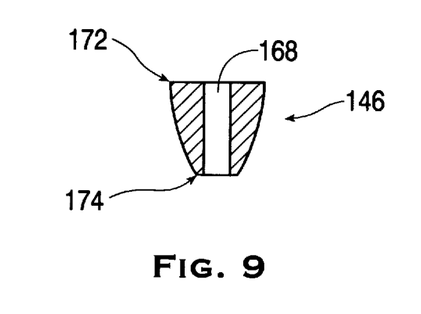
FIG. 9 is a cross-sectional view of the sealing tip of the closing bulb depicted in FIG. 7.

Seal tip 146 is held in position at the tip end 68 of bulb 64 by tip pin 148 and is constructed from an engineering thermoplastic for tightly sealing discharge opening 50 when bulb 64 is positioned in discharge opening 50. The most preferred engineering thermoplastic is a polysulfone material. Seal tip 146 is configured and dimensioned for engaging with valve seal 142. As shown in FIG. 9, seal tip 146 preferably has a substantially tapered conical shape and has a central bore 168 extending axially therethrough for receiving tip pin 148. The first end 172 of seal tip 146 has a greater diameter than the second end 174 of seal tip 146.

Referring to FIG. 6, seal tip 146 is positioned adjacent the blunt end 170 of bulb main body 144, tip pin 148 is inserted into central bore 168 and second bore 154 so that cone 158 of tip pin 148 is positioned adjacent the second end 174 of seal tip 146. Cone 158 is configured and dimensioned to hold seal tip 146 in a fixed position and preferably includes a lip 176 which assists in holding seal tip 146.

Figure 7:
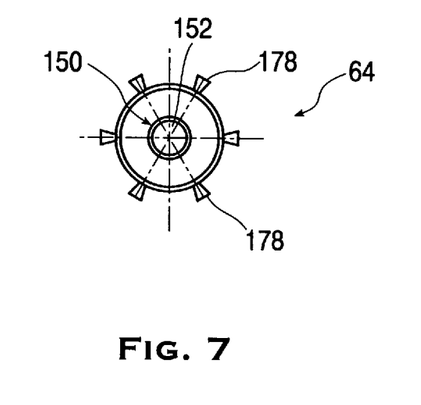
FIG. 7 is a top end view of the closing bulb depicted in FIG. 6.

Referring to FIGS. 6 and 7, main body 144 includes a plurality of fins 178 which are preferably integral with main body 144. Alternatively, fins 178 may be formed independently from the main body 144 and connected thereto by any known conventional attachment means. Fins 178 are advantageous in that they help to align the bulb 64 within second internal chamber 28 and they also assist in creating a laminar flow pattern for flow through the second internal chamber 28. Fins 178 preferably have a tapered cross-section so that they widen as they extend away from main body 144.

Figures 10, 11:
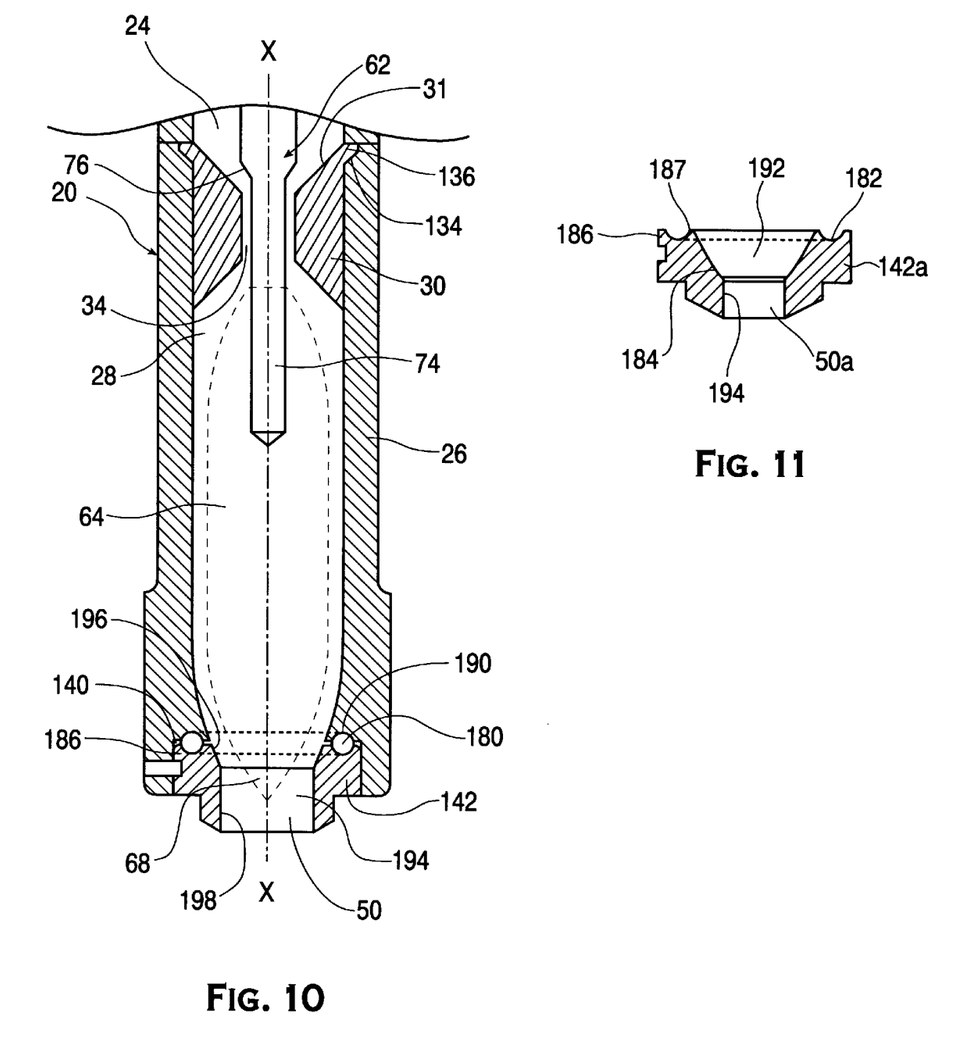
FIG. 10 is an exploded partial cross-sectional view of the lower end of the valve assembly depicted in FIG. 5 showing a removable valve seat positioned on the valve assembly.
FIG. 11 is a cross-sectional view of an alternative embodiment of the valve seat shown in FIG. 10.

Referring to FIG. 10, an exploded view of the lower casing 26 is shown with the bulb 64 in phantom. Flow restrictor portion 30 is shown positioned within body 20 between first chamber 24 and second chamber 28. Appendages 136 of flow restrictor portion 30 are engaged within depressions 134 of lower casing 26 to properly position flow restrictor portion 30 within the body 20.

Shaft 62 extends axially through channel 34. Intermediate portion 76 of shaft 62 is positioned upstream of flow restrictor portion 30. Bulb 64 is positioned downstream of flow restrictor portion 30 and is connected to the second portion 74 of shaft 62 by conventional means, such as by pin or by screw threads as discussed above. When intermediate portion 76 is positioned upstream of channel 34, tip end 68 of bulb 64 is positioned upstream of discharge opening 50.

As discussed above for FIG. 5, lower casing 26 includes recess 140 for receiving removable valve seat 142. Valve seat 142 is advantageously removable to vary the size of discharge opening 50. Two different embodiments of valve seat 142 are shown in FIGS. 10–11.

The valve seat 142 shown in FIG. 10 is suited for use with wider mouthed bottles, such as conventional 32 oz. or 64 oz. bottles having a mouth diameter of about 43 mm. Valve seat 142 defines a larger diameter discharge opening 50 and produces a wider column of liquid than the valve seat shown in FIG. 11. Valve seat 142 includes an aperture 194 extending axially therethrough in substantial axial alignment with longitudinal axis X—X and second chamber 28.

Aperture 194 defines the area through which fluid flows through valve seat 142 and includes a first portion 196, adjacent the second chamber 29, and a second portion 198, adjacent discharge opening 50. First portion 196 preferably tapers inwardly in a substantial conical shape and aligns at the top surface 187 thereof with the internal wall of lower casing 26. First portion 196 extends downstream of lower casing 26 to meet second portion 198. Second portion 198 is substantially cylindrical in shape. The contours of first portion 196 are preferably configured and dimensioned for engagement with bulb 64 to enable bulb 64 to close discharge opening 50.

Valve seat 142 preferably includes a quick release attachment feature. Valve seat 142 includes a plurality of teeth 186 which extend outwardly therefrom. These teeth 186 are preferably evenly-spaced around the circumference of valve seat 142. Recess 140 of lower casing 26 includes grooves for receiving teeth 186. Teeth 186 are preferably of the bayonet mount type in that the valve seat 142 may be inserted into recess 140 and rotated 45° to engage teeth 186 within the grooves in recess 140. Alternatively, screw threads or other conventional connection means are also contemplated.

O-ring seal 180 is preferably positioned between valve seat 142 and lower casing 26 to seal the connection between the valve seat 142 and lower casing 26. As shown clearly in FIG. 11, valve seat 142 includes a substantially circular recess 182 on its top surface 187 around the periphery thereof for receiving the O-ring seal 180. Lower casing 26 may also include a similarly shaped recess 190 for receiving the O-ring seal 180.

Valve seat 142A, shown in FIG. 11, defines a smaller diameter discharge opening 50A than that of FIG. 10 and may advantageously be used for bottles having a smaller diameter mouth, such as bottles having about a 28 mm diameter mouth opening. Valve seat 142A has a smaller discharge opening 50A and will, therefore, produce a smaller diameter column of fluid exiting therefrom. The smaller diameter opening 50A is created within the valve seat 142A by defining an opening 192 having a tapered, substantially conical first section 184, adjacent second chamber 28, and a substantially cylindrical second section 194, adjacent discharge opening 50A.

A removable valve seat is advantageous in that differently sized valve seats 142, 142A may be used with the same valve assembly 131. By providing variable sized openings 50, 50A, the velocity of the flow exiting discharge opening 50, 50A can be optimized. This is particularly advantageous for fluids which have a tendency to foam, since a reduction in velocity results in less foam.

Thus, it is seen that the present invention provides a relatively simple and inexpensive valve assembly which will allow normal filling of a container with the added benefit of deterring splattering and allowing adjustability to vary the rate of flow.

It should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the present invention are to be included as further embodiments of the present invention. The scope of the present invention, accordingly, is to be defined as set forth in the appended claims.

What is claimed is:

1. A valve assembly comprising:
   a body defining an internal chamber having a fixed wall at a first end and a discharge opening at a second end, said internal chamber being divided into a first chamber and a second chamber by an inwardly extending flow restrictor portion, said first chamber being located adjacent said wall and having an inlet for receiving a fluid, and said second chamber being located adjacent said discharge opening;
   a valve extending axially through and being movable within said internal chamber, said valve having a shaft of varying diameter operatively associated with the flow restrictor portion, with one end of the shaft connected to a bulb, said bulb being positioned in said second chamber, and said shaft extending from said bulb and second chamber through said first chamber via said restrictor portion and through said wall, said bulb being engagable with said discharge opening to seal said discharge opening when at least a portion of said shaft of varying diameter is in sealing association with at least a portion of the flow restrictor portion; and
   means for actuating said valve between a first fixed position, wherein fluid does not flow through the body, and a second fixed position, wherein the flow of fluid through said flow restrictor portion and discharge opening is permitted, said actuating means further providing means for variably selecting-the second fixed positions, wherein in the second position, the flow restrictor portion and discharge opening are held open to allow fluid to flow through the body.

2. The valve assembly of claim 1, wherein said actuating means is actuatable between a third position, wherein fluid does not flow through said flow restrictor portion while flow through said discharge opening is permitted.

3. The valve assembly of claim 2, wherein said actuating means is actuatable between a fourth position, wherein fluid flow through said flow restrictor portion and discharge opening is reduced.

4. The valve assembly of claim 1, wherein said valve assembly further comprises a flexible seal providing a leak-proof barrier between said first chamber and said wall, wherein said shaft extends through said seal.

5. The valve assembly of claim 4, wherein said flexible seal is a diaphragm positioned between the body and the wall at the first end of the body and a clamp is coupled to an exterior of said wall and said body to hold said wall, diaphragm, and body together.

6. The valve assembly of claim 1, wherein said body includes a valve seat positioned in said discharge opening and said bulb is engagable with said valve seat to seal said discharge opening.

7. The valve assembly of claim 6, wherein said valve seat is removable from and positionable within a recess formed at the discharge opening in the body.

8. The valve assembly of claim 6, wherein said bulb is tapered at an end adjacent the discharge opening, and said valve seat is annular for sealingly engaging said bulb when said actuating means is in the first position, said tapered end of said bulb extending through the discharge opening when in the first position to engage said valve seat.

9. The valve assembly of claim 8, wherein said bulb includes a main body portion, a sealing tip portion and a tip pin portion, said main body portion being substantially cylindrical and having a first central bore extending therethrough between each end thereof, said sealing tip portion being substantially conical and including a second central bore for alignment with the first central bore and positioned adjacent said main body portion; and said tip pin portion having a substantially cylindrical body with a cone portion at one end, said cone portion having a diameter greater than the body, wherein the body of the tip pin portion is inserted into the first and second central bores for joining the sealing tip portion between the cone and the main body portion.

10. The valve assembly of claim 9, wherein the main body portion includes a plurality of integrally formed fins extending outwardly therefrom.

11. The valve assembly of claim 9, wherein said sealing tip portion is resilient.

12. The valve assembly of claim 1, wherein said first and second chambers are cylindrical and the first chamber has an internal diameter greater than an internal diameter of said second chamber.

13. The valve assembly of claim 12, wherein said inwardly extending flow restrictor portion has an internal diameter which is smaller than the internal diameters of said first and second chambers.

14. The valve assembly of claim 13, wherein the flow restrictor portion has a first slanted wall adjacent the first chamber, and a second slanted wall adjacent the second chamber, with the first and second slanting walls inwardly slanting toward each other and defining an opening at a narrowest point of the flow restrictor portion, and wherein the shaft extends through the opening in the flow restrictor portion.

15. The valve assembly of claim 14, wherein the shaft is cylindrical and includes a first and a second portion, said first portion having a diameter greater than said second portion and the second portion being connected to the bulb.

16. The valve assembly of claim 15, wherein a tapered portion of the shaft is positioned between the first portion and the second portion.

17. The valve assembly of claim 16, wherein the first portion of the shaft is substantially the same diameter as the opening in the flow restrictor portion so that when the first portion enters the opening, fluid does not flow through the opening.

18. The valve assembly of claim 17, wherein when the tapered portion of the shaft enters the opening in the flow restrictor portion, fluid flow through the opening is reduced.

19. The valve assembly of claim 1, wherein said bulb includes a plurality of fins for axially aligning the bulb within the second internal chamber and for assisting in creating a laminar flow pattern for fluid that flows through the second internal chamber.

20. The valve assembly of claim 1, further comprising means for variably limiting movement of the valve.

* * * * *

UNITED STATES PATENT AND TRADEMARK OFFICE
CERTIFICATE OF CORRECTION

PATENT NO. : 5,878,992

DATED : March 9, 1999

INVENTOR(S) : Edwards et al.

It is certified that error appears in the above-identified patent and that said Letters Patent is hereby corrected as shown below:

Col. 7, line 38: replace "axial" with --axially--;

Claim 1, col. 11, line 45: change "positions" to --position--.

Signed and Sealed this

Twentieth Day of July, 1999

Attest:

Q. TODD DICKINSON

*Attesting Officer*  *Acting Commissioner of Patents and Trademarks*